United States Patent
Thapa

(10) Patent No.: US 10,097,611 B2
(45) Date of Patent: Oct. 9, 2018

(54) INDIVIDUAL ADJUSTMENT OF AUDIO AND VIDEO PROPERTIES IN NETWORK CONFERENCING

(71) Applicant: Optical Fusion, Inc., Palo Alto, CA (US)

(72) Inventor: Mukund Thapa, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 44 days.

(21) Appl. No.: 14/727,585

(22) Filed: Jun. 1, 2015

(65) Prior Publication Data
US 2015/0264102 A1 Sep. 17, 2015

Related U.S. Application Data

(63) Continuation of application No. 12/130,998, filed on May 30, 2008, now Pat. No. 9,060,094.
(Continued)

(51) Int. Cl.
*G06F 17/00* (2006.01)
*H04L 29/06* (2006.01)
(Continued)

(52) U.S. Cl.
CPC ........ *H04L 65/604* (2013.01); *H04L 65/1089* (2013.01); *H04L 65/1093* (2013.01);
(Continued)

(58) Field of Classification Search
CPC ............... H04L 65/604; H04L 65/4046; H04L 65/1089; H04L 65/1093; H04L 65/4038;
(Continued)

(56) References Cited

U.S. PATENT DOCUMENTS

| 4,449,238 A | 5/1984 | Lee et al. |
| 4,720,850 A | 1/1988 | Oberlander et al. |

(Continued)

FOREIGN PATENT DOCUMENTS

EP 1465193 10/2004

OTHER PUBLICATIONS

H.323 specification; copyright 2000.*
(Continued)

*Primary Examiner* — Paul McCord
(74) *Attorney, Agent, or Firm* — Lowenstein Sandler LLP

(57) ABSTRACT

Individual adjustment of audio volume and video properties in a computer network conference environment is provided. For audio adjustment, a buffer collects incoming streams; a stream decoder decodes the buffered audio streams, a gain adjustment applies a gain increase or decrease to the individual audio stream, and a mixer combines each of the individual signals together. The gain adjustment module receives input from a user interface control associated with each participant, and adjusts the volume of that participant's stream accordingly. If a requested increase in gain would cause an overflow of the signal, only a gain increase that will avoid such overflow is applied. Video properties such as brightness, contrast and saturation are also adjustable. Properties of the user's transmitted audio and video streams are also adjustable.

23 Claims, 5 Drawing Sheets

Related U.S. Application Data

(60) Provisional application No. 60/976,464, filed on Sep. 30, 2007.

(51) Int. Cl.
*H04N 7/15* (2006.01)
*H04N 5/04* (2006.01)
*H04M 3/56* (2006.01)

(52) U.S. Cl.
CPC ........ *H04L 65/403* (2013.01); *H04L 65/4038* (2013.01); *H04N 5/04* (2013.01); *H04N 7/15* (2013.01); *H04L 65/4046* (2013.01); *H04M 3/562* (2013.01); *H04M 3/564* (2013.01); *H04M 3/568* (2013.01); *H04N 7/155* (2013.01)

(58) Field of Classification Search
CPC ..... H04L 65/403; H04M 3/562; H04M 3/564; H04M 3/568; H04N 5/04; H04N 7/15; H04N 7/155
USPC .......................................... 700/94; 348/14.08
See application file for complete search history.

(56) References Cited

U.S. PATENT DOCUMENTS

| | | | |
|---|---|---|---|
| 5,488,570 A * | 1/1996 | Agarwal | H04N 7/15 345/501 |
| 5,648,814 A * | 7/1997 | Munson | H04N 7/15 348/14.1 |
| 5,689,641 A | 11/1997 | Ludwig et al. | |
| 5,758,079 A | 5/1998 | Ludwig et al. | |
| 5,854,640 A | 12/1998 | North et al. | |
| 5,973,724 A | 10/1999 | Riddle | |
| 6,119,147 A | 9/2000 | Toomey et al. | |
| 6,233,226 B1 | 5/2001 | Gringeri et al. | |
| 6,288,739 B1 | 9/2001 | Hales et al. | |
| 6,354,748 B1 | 3/2002 | Vrvilo | |
| 6,405,255 B1 | 6/2002 | Stoltz et al. | |
| 6,501,717 B1 | 12/2002 | Yamazaki | |
| 6,549,587 B1 | 4/2003 | Li | |
| 6,577,737 B1 | 6/2003 | Krochmal et al. | |
| 6,603,450 B1 | 8/2003 | Yamazaki et al. | |
| 6,606,111 B1 * | 8/2003 | Kondo | H04N 7/142 348/14.01 |
| 6,680,745 B2 * | 1/2004 | Center, Jr. | H04N 7/148 348/14.08 |
| 6,763,253 B1 | 7/2004 | Niehoff et al. | |
| 6,795,740 B1 | 9/2004 | Chu et al. | |
| 6,836,295 B1 | 12/2004 | Cooper | |
| 6,906,741 B2 | 6/2005 | Canova, Jr. et al. | |
| 6,940,855 B2 | 9/2005 | Okamura | |
| 6,972,786 B1 | 12/2005 | Ludwig | |
| 7,084,898 B1 | 8/2006 | Firestone et al. | |
| 7,133,934 B1 | 11/2006 | Rossello et al. | |
| 7,369,699 B1 | 5/2008 | Christie | |
| 7,526,525 B2 | 4/2009 | Hagale et al. | |
| 7,558,391 B2 | 7/2009 | Bizjak | |
| 7,559,031 B2 | 7/2009 | Kawamura et al. | |
| 7,570,694 B2 | 8/2009 | Le Goff | |
| 7,592,532 B2 | 9/2009 | Coleman | |
| 7,617,280 B1 | 11/2009 | Webster et al. | |
| 7,620,410 B2 | 11/2009 | Takizawa et al. | |
| 7,672,742 B2 | 3/2010 | Ng et al. | |
| 7,697,553 B2 | 4/2010 | Karlsen et al. | |
| 7,762,665 B2 * | 7/2010 | Vertegaal | G06F 3/011 351/209 |
| 7,822,811 B2 * | 10/2010 | Moore | H04L 63/065 348/14.08 |
| 8,060,366 B1 | 11/2011 | Maganti et al. | |
| 8,081,205 B2 | 12/2011 | Baird et al. | |
| 8,213,503 B2 | 7/2012 | Tu et al. | |
| 8,214,516 B2 | 7/2012 | Gupta et al. | |
| 8,319,790 B2 * | 11/2012 | Ho | G09G 5/06 345/602 |
| 8,335,576 B1 | 12/2012 | Bradshaw et al. | |
| 2002/0030157 A1 * | 3/2002 | Hokoi | H04N 1/40056 250/234 |
| 2002/0055796 A1 | 5/2002 | Katayama et al. | |
| 2002/0113862 A1 * | 8/2002 | Center, Jr. | H04N 7/148 348/14.08 |
| 2002/0145610 A1 | 10/2002 | Barilovits et al. | |
| 2002/0194054 A1 | 12/2002 | Frengut | |
| 2002/0196492 A1 | 12/2002 | Trisnadi et al. | |
| 2003/0035371 A1 | 2/2003 | Reed et al. | |
| 2003/0043260 A1 | 3/2003 | Yap et al. | |
| 2003/0174826 A1 | 9/2003 | Hesse | |
| 2004/0008249 A1 | 1/2004 | Nelson et al. | |
| 2004/0008635 A1 | 1/2004 | Nelson et al. | |
| 2004/0028199 A1 | 2/2004 | Carlson | |
| 2004/0119814 A1 | 6/2004 | Clisham et al. | |
| 2004/0141528 A1 | 7/2004 | LeBlanc et al. | |
| 2004/0223464 A1 | 11/2004 | Dye et al. | |
| 2004/0228396 A1 | 11/2004 | Wood, Jr. | |
| 2004/0258047 A1 | 12/2004 | Miao | |
| 2005/0073575 A1 | 4/2005 | Thacher et al. | |
| 2005/0081160 A1 | 4/2005 | Wee et al. | |
| 2005/0085935 A1 | 4/2005 | Ide | |
| 2005/0099492 A1 | 5/2005 | Orr | |
| 2005/0213739 A1 | 9/2005 | Rodman et al. | |
| 2005/0237377 A1 | 10/2005 | Chapweske et al. | |
| 2005/0248652 A1 | 11/2005 | Firestone et al. | |
| 2005/0256925 A1 | 11/2005 | Luo et al. | |
| 2005/0259754 A1 | 11/2005 | Ho et al. | |
| 2005/0276282 A1 | 12/2005 | Wells et al. | |
| 2005/0281255 A1 * | 12/2005 | Davies | H04N 21/4307 370/389 |
| 2006/0002681 A1 | 1/2006 | Spilo et al. | |
| 2006/0031290 A1 | 2/2006 | Mannaru et al. | |
| 2006/0050155 A1 | 3/2006 | Ing et al. | |
| 2006/0062368 A1 | 3/2006 | Saha et al. | |
| 2006/0104347 A1 | 5/2006 | Callan et al. | |
| 2006/0129909 A1 | 6/2006 | Butt et al. | |
| 2006/0244812 A1 | 11/2006 | Jeong et al. | |
| 2006/0244819 A1 | 11/2006 | Pun et al. | |
| 2007/0019066 A1 * | 1/2007 | Cutler | H04N 5/23238 348/14.08 |
| 2007/0047731 A1 | 3/2007 | Lipari, III | |
| 2007/0091873 A1 | 4/2007 | LeBlanc et al. | |
| 2007/0093238 A1 | 4/2007 | Lin | |
| 2007/0121530 A1 | 5/2007 | Vadlakonda et al. | |
| 2007/0171998 A1 | 7/2007 | Hietala et al. | |
| 2007/0188597 A1 | 8/2007 | Kenoyer | |
| 2007/0200925 A1 * | 8/2007 | Kim | G06T 11/00 348/14.08 |
| 2007/0203596 A1 | 8/2007 | Huang et al. | |
| 2007/0206089 A1 | 9/2007 | Eshkoli et al. | |
| 2007/0283403 A1 | 12/2007 | Eklund et al. | |
| 2008/0016156 A1 | 1/2008 | Miceli et al. | |
| 2008/0037580 A1 | 2/2008 | Shaffer et al. | |
| 2008/0037749 A1 | 2/2008 | Metzger et al. | |
| 2008/0044101 A1 * | 2/2008 | Huang | H04N 9/643 382/274 |
| 2008/0088698 A1 | 4/2008 | Patel et al. | |
| 2008/0100694 A1 | 5/2008 | Barkley et al. | |
| 2008/0117838 A1 | 5/2008 | Yee et al. | |
| 2008/0218585 A1 * | 9/2008 | Wagner | H04N 5/262 348/14.09 |
| 2008/0240557 A1 * | 10/2008 | Christie | H04N 1/6027 382/167 |
| 2008/0284841 A1 | 11/2008 | Modai et al. | |
| 2008/0291891 A1 | 11/2008 | Jerlhagen et al. | |
| 2009/0210491 A1 | 8/2009 | Thakkar et al. | |
| 2010/0145794 A1 * | 6/2010 | Barger | G06F 17/30867 705/14.45 |

OTHER PUBLICATIONS

Audio Precision AP 2700 test set manual; Copyright 2004.
Boucher, J.A. et al., "Design and Performance of a Multi-Stream MPEG-I System Layer Encoder/Player," in Proceedings of Multimedia Computing and Networking, IS&T/SPIE Symposium on

(56) References Cited

OTHER PUBLICATIONS

Electronic Imaging Science and Technology, Feb. 1995, eighteen pages, vol. 2417.
Intel Corporation, "High Definition Audio Specification, Revision 1.0a," Jun. 17, 2010, two hundred twenty-five pages.
International Telecommunication Union, "Call signaling protocols and media stream packetization for packet-based multimedia communication systems," 2000, ITU-T Recommendation H.225.0, two hundred fifty-one pages.
International Telecommunication Union, "Packet-based multimedia communications systems. Annex R: Robustness methods for H.323 entities," 2001, ITU-T Recommendation H.323, thirty pages.
Liang, L-S et al., "Design, Implementation and Performance Measurement of Multi-Point Video-Conference Bridge (MPVCB) over ATM Switch," IEEE, 1994, pp. 1478-1482.
PCT International Search Report and Written Opinion, PCT/US08/78326, dated Dec. 12, 2008, eight pages.
PCT International Search Report and Written Opinion, PCT/US08/78206, dated Dec. 2, 2008, seven pages.
PCT International Search Report and Written Opinion, PCT/US08/78203, dated Dec. 2, 2008, eight pages.
PCT International Search Report and Written Opinion, PCT/US08/78196, dated Dec. 2, 2008, ten pages.
Singh, K.N., "Reliable, Scalable and Interoperable Internet Telephony," Columbia University Thesis, 2006, copyright 2006, [Online] [Retrieved on Nov. 23, 2008] Retrieved from the Internet<URL:http://www1.cs.columbia.edu/-kns10/publication/thesis.pdf->.
Zeng, P. et al., "A Grouped Network Video Conference System Based on JMF in Collaborative Design Environment," Third International IEEE Conference on Signal-Image Technologies and Internet-Based System, 2007, pp. 129-136.
India Patent Office, Examination Report, Indian Patent Application No. 1654/CHENP/2010, dated Oct. 16, 2015, three pages.
United States Advisory Action, U.S. Appl. No. 12/130,998, dated Jan. 9, 2015, four pages.
United States Office Action, U.S. Appl. No. 12/130,998, dated Aug. 21, 2014, seventeen pages.
United States Office Action, U.S. Appl. No. 12/130,998, dated Jan. 28, 2014, sixteen pages.
United States Office Action, U.S. Appl. No. 12/130,998, dated Jul. 30, 2012, sixteen pages.
United States Office Action, U.S. Appl. No. 12/130,998, dated Feb. 2, 2012, fourteen pages.
India Patent Office, Examination Report, Indian Patent Application No. 1787/CHENP/2010, dated Feb. 24, 2016, three pages.
India Patent Office, First Examination Report, Indian Patent Application No. 1714/CHENP/2010, dated Feb. 26, 2016, two pages.
India Patent Office, First Examination Report, Indian Patent Application No. 1749/CHENP/2010, dated Apr. 8, 2016, two pages.

* cited by examiner

INDIVIDUAL ADJUSTMENT OF AUDIO AND VIDEO PROPERTIES IN NETWORK CONFERENCING

CROSS REFERENCE TO RELATED APPLICATIONS

This application is a continuation of U.S. application Ser. No. 12/130,998, filed on May 30, 2008, which claims the benefit of U.S. Provisional Application No. 60/976,474, filed on Sep. 30, 2007, and which is incorporated by reference herein in its entirety.

BACKGROUND OF THE INVENTION

Field of the Invention

The present invention relates generally to audio and video conferencing over a network. In particular, the present invention is directed towards independent adjustment of multiple audio and video streams during a networked conference call.

Description of Background Art

Conventional networking software for video and audio conferencing permits one-way, two-way and in some cases multi-way communication between participants. Because each participant may be in a different environment, audio transmission characteristics may vary among them. For example, one participant may be talking too loudly for the receiving user's taste; another too quietly. In such a situation, simply turning up the volume on the receiver's computer is not helpful, as it can make those participants that are already loud even louder. Turning down the volume has the opposite effect—those that are too quiet get even more quiet.

Similarly, video images can vary widely among participants. Differences in video camera technology, encoding quality, and ambient conditions are just some factors that result in disparate images. Typical video adjustment controls allow a user to adjust brightness, contrast or sharpness, etc., either on the display screen—affecting everything that is displayed—or within the networking application, but globally for all participants.

SUMMARY

Embodiments of the present invention enable the individual adjustment of audio volume and video properties in a computer network conference environment. With respect to audio adjustment, a system of the present invention includes a buffer, which collects the incoming streams from a network interface device; a stream decoder, which decodes the buffered audio streams; a gain adjustment module, which applies a gain increase or decrease to the individual audio stream, and a mixer that combines each of the individual signals together. The gain adjustment module in one embodiment receives input from a user interface control associated with each participant, and adjusts the volume of that participant's stream accordingly. In one embodiment, the gain adjustment module determines in advance whether a requested increase in gain would cause an overflow of the signal, and applies only a gain increase that will avoid such overflow. In one embodiment, the transmission volume of the user's transmitted stream is also adjustable.

With respect to video, a system of the present invention additionally includes a buffer for collecting incoming video streams arriving over the network interface device; a video stream decoder, which decodes the buffered video streams; and a video adjustment module, which applies one or more adjustments to the video stream, such as, for example, brightness, contrast, sharpness, hue, zoom, display size or saturation adjustments. In one embodiment, the video adjustment module determines in advance whether a requested video adjustment would cause an overflow of the signal, and applies only an increase that will avoid such an overflow. In one embodiment, the transmission properties of the user's transmitted video stream are also adjustable.

DETAILED DESCRIPTION OF THE PREFERRED EMBODIMENTS

Figure 1:
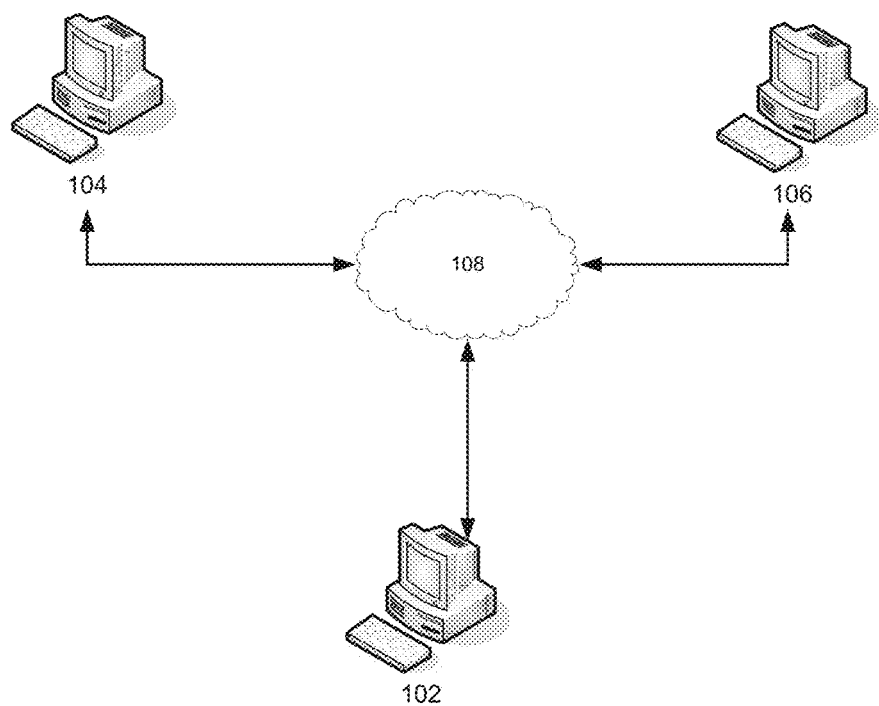
FIG. 1 illustrates an environment in which participants communicate via network computers according to an embodiment of the present invention.

FIG. 1 illustrates an environment in which participants communicate via network computers. Although only three computers are illustrated in FIG. 1, this is merely for clarity of description. Those of skill in the art will appreciate that a greater number of participants may be involved in the conference. For purposes of discussion, assume that a user wishing to individually adjust volume or video image properties of participants is using computer 102, and computers 104 and 106 are remote users connected to the conference as participants over the network. Assume also that user of computer 102 is transmitting audio and video to the other participants, and that they are transmitting audio and video to each other as well as to computer 102. Note that computers may include not just personal computers, but also laptops, PDAs, videophones, and the like.

Figure 2:
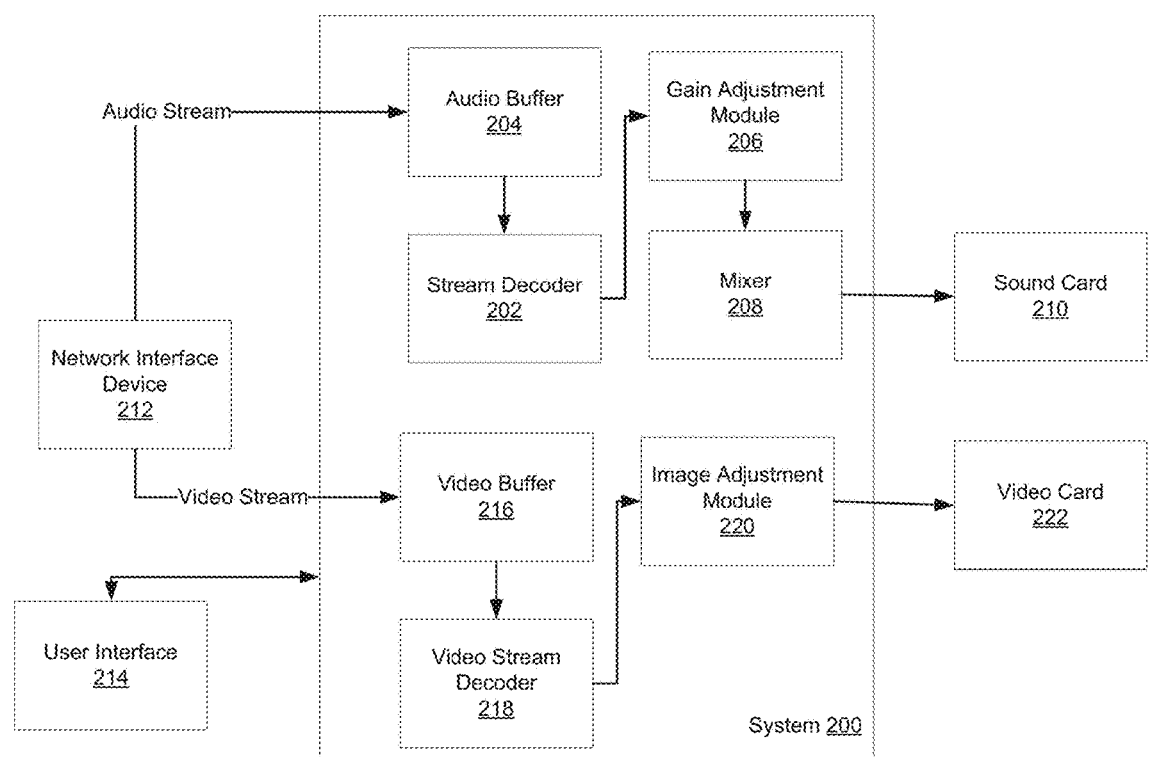
FIG. 2 is a block diagram of the overall architecture of an embodiment of the present invention.

FIG. 2 illustrates a block diagram of a system 200 for providing individual audio adjustment and individual video image adjustment in accordance with an embodiment of the present invention. System 200 includes an audio stream decoder 202, an audio buffer 204, a gain adjustment module 206, a mixer 208, a video buffer 216, a video stream decoder 218, and an image adjustment module 220. FIG. 2 also illustrates a network interface device 212, which handles network traffic for the computer, a sound card 210 that provides audio output for the computer, a video card 222 that provides video output, and a user interface 214, which allows a user of the computer to interact with system 200.

Audio streams are received by computer 102 via network interface device 212. Once a stream is received over the network 108, it is passed to buffer 204. Buffer 204 collects packets of the stream as they arrive over the network. In one embodiment, the size of each packet is 40 ms, but in alternate embodiments packets may be of different size. Because network packets may arrive out of order and with varying degrees of latency, buffering allows the packets to be reordered correctly and helps avoid jitter caused by latency. In one embodiment, buffer 204 is of fixed size. In an alternative embodiment, buffer 204 is of variable size. Once a threshold number of ordered packets are in the buffer, the stream is passed by the buffer 204 to stream decoder 202. Stream decoder 202 decodes the stream, e.g., by uncompressing it. The decoded stream is then passed to gain adjustment module 206.

Video streams are also received by computer 102 via network interface device 212. Once a video stream is received over the network 108, it is passed to video buffer 216. Buffer 216 collects packets of the stream as they arrive over the network. Once a threshold number of ordered packets are in the buffer, the stream is passed by the video buffer 216 to video stream decoder 218. Video stream decoder 218 decodes the stream, and the decoded stream is then passed to image adjustment module 220.

Figure 3:
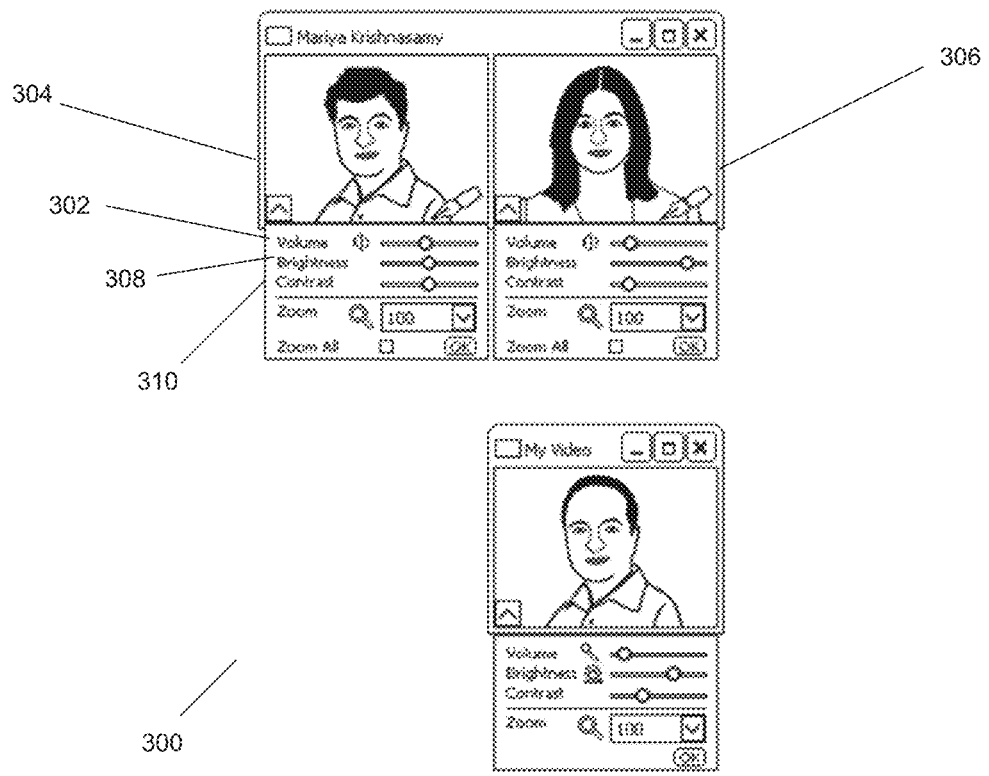
FIG. 3 illustrates a user interface through which audio and video properties can be adjusted individually in accordance with an embodiment of the present invention.

FIG. 3 illustrates a user interface 300 for conducting a network conference in accordance with an embodiment of the present invention. In the illustrated case, the type of network conference is a videoconference, in which there are a total of three participants—a first 304 and second 306 remote user, and the local user viewing the user interface. Each participant window has an associated set of adjustments that can be made to the transmission from that participant. In particular, a volume adjustment slider 302, a brightness adjustment slider 308, and a contrast slider 310 can be adjusted for each participant in the conference. Although not illustrated in FIG. 3, additional sliders are present in various embodiments allowing adjustment of properties such as sharpness, hue, zoom, display size and saturation. In one embodiment, the sliders are initially set in a center position, indicating that no adjustment will be made to the audio or video streams. Adjusting slider 302 to the right of center causes the volume level of the audio stream for that participant to be increased; adjusting it to the left causes it to be decreased. In an alternative embodiment, the slider initially starts out at the left edge of the range, and only increases to the volume level of the audio stream may be made. In yet another alternative embodiment, the slider starts at a position somewhere along the range that is a default selection chosen by the user, and the user may increase or decrease the volume of the participant by moving the slider right or left, respectively. In a similar fashion, brightness adjustment slider 308 can be adjusted to the right to make the image brighter, or to the left to make the image darker. Slider 310 can be adjusted right or left to increase or decrease contrast, respectively. Sharpness, hue, zoom, display size and saturation are adjustable in one embodiment in a similar manner.

Gain adjustment module 206 receives as input from user interface 214 an indication of the position of slider 302. In one embodiment, the position of the slider is translated by gain adjustment module 206 into a multiplier. In one embodiment, a multiplier of 1 is defined to mean that the gain of the stream should not be adjusted, while numbers larger than 1 indicate an increase in gain, and numbers lower than 1 indicate a decrease in gain. As will be apparent to those of skill in the art, any appropriate scaling system may be used to indicate the desired gain change in alternative embodiments.

If the multiplier is 1, then no gain adjustment should be made. In such a case, the gain adjustment module 206 simply passes the stream through to mixer 208. Alternatively, if the multiplier is less than 1, the gain must be lowered. Gain adjustment module 206 accordingly lowers the gain of the stream to match the given multiplier. For example, if the multiplier is 0.5, then gain adjustment module 206 decreases the gain by 50%.

Conversely, if the multiplier is larger than 1, then the gain should be adjusted upward. Unlike lowering the gain, however, increasing the gain runs the risk of exceeding the range of representable numbers, resulting in a number overflow with potentially undesirable results, and a noticeably unpleasant sound for the user. To handle this, gain adjustment module 206 in one embodiment employs an algorithm to anticipate and avoid an overflow by clipping the audio.

To determine when an overflow will occur, in one embodiment gain adjustment module 206 performs gain calculations in a higher number representation. In one embodiment, the gain multiplier is a floating point number, i.e. the samples are integral, and the calculations are done with either single or double precision. In general, if the gain is too high, the calculated number will overflow its base representation.

The computed value is checked against the largest allowable sample value. If one unsigned byte is used, the largest allowable sample value is 255. If two bytes are used, i.e. 16 bit audio, then the largest allowable sample value is 65535. When signed quantities are used, then the range is −128 to 127 and −32768 to 32767, respectively. In the case of 8-bit (1 byte) audio, if the determined value is below −128, then it is set to −128. If the determined value is above 127, then it is set to 127. For 16-bit audio (two bytes), the boundaries are −32768 and 32767. Those of skill in the art will appreciate that more bits may be used in alternative embodiments.

In one embodiment, when the gain multiplier is lowered to avoid overflow, gain adjustment module 206 provides an indication of the actual multiplier being used to user interface 214. User interface 214 in one embodiment responds by lowering the slider 302 to indicate to the user that the volume of the stream has not been adjusted to the level originally chosen by the user. Alternatively, user interface 214 leaves the slider at maximum, preventing the user from attempting to further increase the volume of the stream. In one embodiment, the stream is monitored periodically and if the sending user's transmission volume is lowered, e.g., the sender moves away from the microphone, user interface 214 repositions the slider 302 to indicate that the volume can now be increased if desired.

Once the gain of the stream has been lowered or raised, or unaltered if appropriate, the stream is passed to mixer 208.

As will be appreciated by those of skill in the art, an audio stream is received from each participant in the conference that is transmitting audio to the user's computer 102. In one embodiment, system 200 treats each stream as separate, for purposes of buffering, gain adjustment and mixing. This enables individual adjustment to the gain of each stream. As illustrated in FIG. 3, each participant window has an independently alterable volume slider. User interface 214 provides the output of each slider to system 200, and gain adjustment module 206 applies a multiplier to each stream individually in order to reflect the chosen volume received via the user interface module 214. When the various streams are received by mixer 208, they are mixed together and output to the audio device 210 of the computer 102 being used by the user. In one embodiment, mixer 208 includes a buffer to eliminate jitter.

In one embodiment, a normalization feature is provided in which gain adjustment module 206 automatically adjusts the gain applied to each audio signal in order to provide audio output from each participant that is at the same relative volume. This volume can itself be adjusted via user interface 214.

Image adjustment module 220 enables a user to adjust various image properties associated with each participant's video stream. In various embodiments, brightness, contrast, saturation, sharpness, hue, zoom, and display size properties are adjustable. In alternative embodiments, more or fewer image properties are adjustable. As with audio adjustment described above, a user provides an indication of the desired change to an image property via user interface 214, which in turn is passed to image adjustment module 220. A formula or multiplier is applied to values the selected image property to effect the change requested by the user. In one embodiment, an image is in RGB format; alternatively the video can be in YUV format, or in any other suitable format known to those of skill in the art. Each channel of the image is adjusted according to the multiplier or formula. In one embodiment, image adjustment module 220 determines when an overflow would occur based on a multiplier set too high, and clips the value to avoid the condition. For example, if brightness is being adjusted, and each channel can have a value between 0 and 255, an adjustment that results in a value being larger than 255 is detected by image adjustment module 220, and the channel value is instead set to 255. As with audio adjustment described above, user interface 214 indicates in various embodiments to the user that the adjustment has been clipped.

Additional video adjustments that may be performed include mirroring, flipping, rotating and grayscale conversion.

In mirroring, the video image of an individual participant is displayed in a horizontally reversed manner, simulating a mirror image. Image adjustment module 220 applies a mirroring function to the image, such that pixels are reversed in position on a left-right basis.

In flipping, the video image of an individual participant is vertically flipped, simulating turning the image upside down. Image adjustment module 220 applies a flipping function to the image, such that pixels are reversed in position on an up-down basis.

To rotate an individual participant's image, image adjustment module 220 applies a rotating function to the image, such that pixels are relocated 90 degrees from their original position in the image. In alternative embodiments, different degrees of rotation may be applied, as will be appreciated by those of skill in the art.

Grayscale conversion removes the color from an individual participant's image. To apply a grayscale conversion, image adjustment module 220 adjusts the color saturation module for that image to a minimum value, removing the color from the image.

Figure 4:
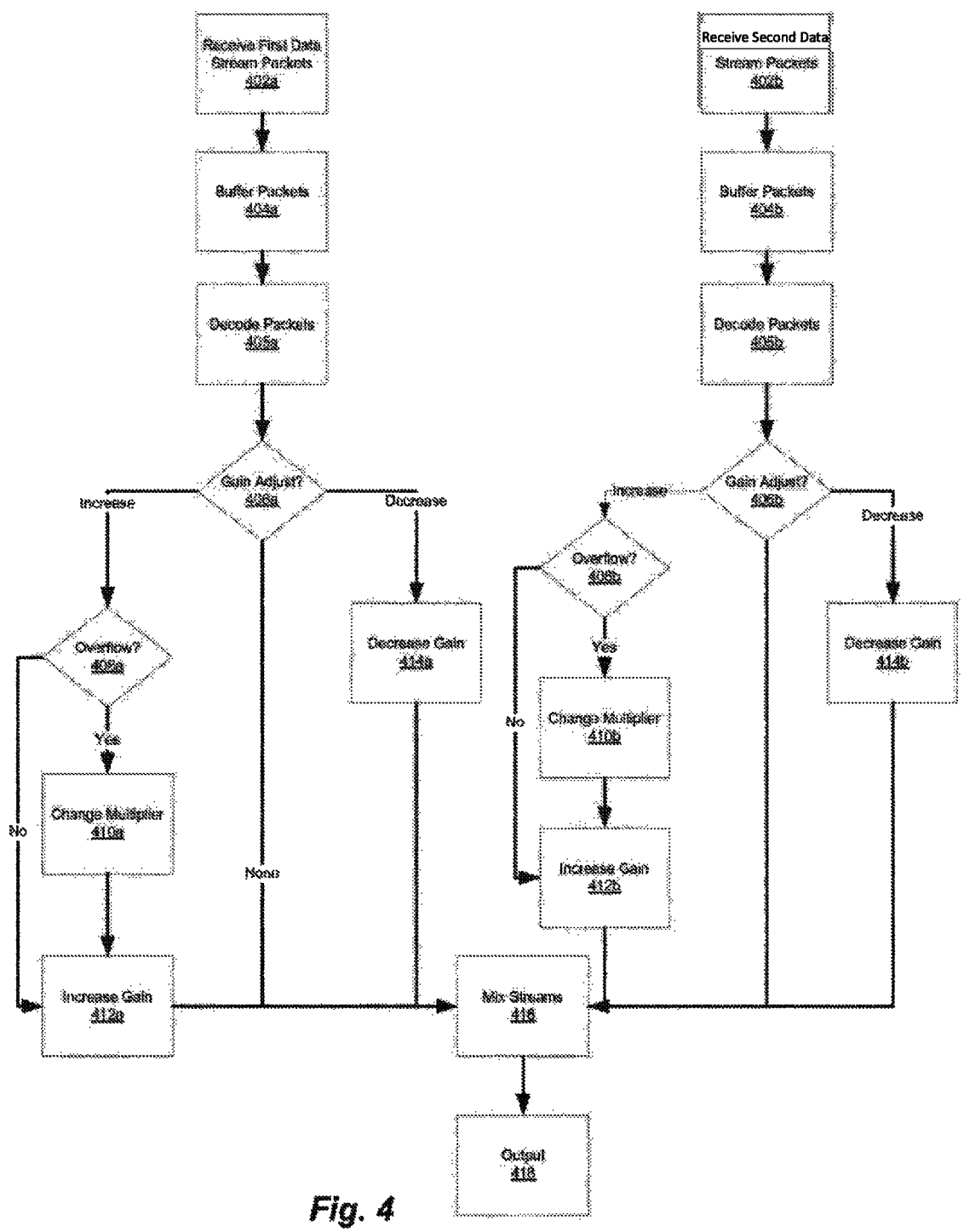
FIG. 4 is a flowchart illustrating a method for independently adjusting audio volume of participants in accordance with an embodiment of the present invention.

FIG. 4 is a flowchart that illustrates a method for individually adjusting audio in a network conference in accordance with an embodiment of the present invention. To illustrate the independent nature of the audio adjustment, the flowchart shows a process flow involving two separate streams. Reference numbers in this description of FIG. 4 correspond to each of the instances of that reference number in the Figure, e.g., 402 refers to 402*a* and 402*b*.

In one embodiment, system 200 allows a participant in the conference to individually adjust his transmission volume by applying a similar gain adjustment to that described above. The user manipulates a control on the user interface such as a slider, and the user interface 214 passes the information to gain adjustment module 206. Gain adjustment module 206 receives the multiplier from user interface 214, and applies the appropriate increase or reduction to the outbound audio stream. This allows the user to manipulate his transmission volume without requiring him to change the microphone volume within the operating system's control.

In one embodiment, gain adjustment is applied after the mixing together of the multiple streams. Although such an embodiment does not provide for individual volume adjustment, it does allow the user to manipulate the volume of the conference participants without the need to adjust the system volume.

Initially, first and second audio streams are received 402. The streams are then buffered 404 and decoded 405. Next, if 406 user interface 214 indicates that the gain should be adjusted, gain adjustment module 206 determines whether it should be increased or decreased. If the gain is to be increased, gain adjustment module 206 checks 408 to determine whether the increase will cause clipping. If so, then the multiplier is changed 410 to a level where no clipping will occur. Once this change has been applied, if needed, the gain is increased 412. Alternatively, the gain is decreased 414 if so requested. Next, each of the incoming streams is mixed 416 by mixer 208, and the mixed stream is sent to output 418. In this manner, audio levels in a network conference are adjusted individually, separately from the device's master volume.

Figure 5:
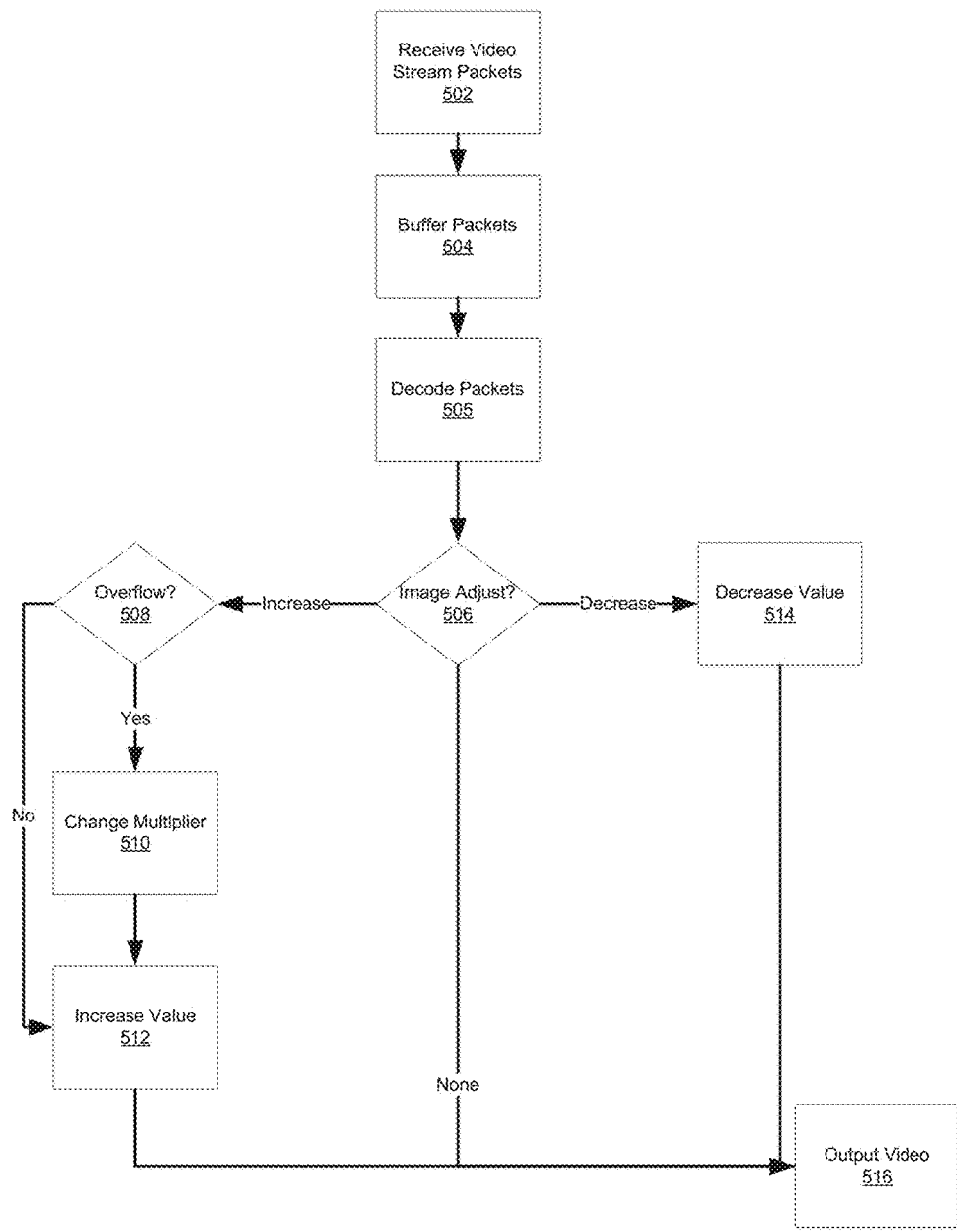
FIG. 5 is a flowchart illustrating a method for independently adjusting video properties of participants in accordance with an embodiment of the present invention.

FIG. 5 is a flowchart that illustrates a method for individually adjusting video properties in a network conference in accordance with an embodiment of the present invention. Packets of the video stream are received 502 and buffered 504 in video buffer 216. Once a sufficient number of packets have accumulated in the video buffer 216, the packets are then decoded 505 by video stream decoder 218. Next, any user-requested image adjustment 506 is applied. If 506 the adjustment will result in an overflow 508 condition, image adjustment module 220 adjusts 510 the multiplier to avoid the overflow. The increased value is then applied 512 to the stream, and the video is output 516. Similarly, if the image adjustment is a decrease, the decreased adjustment is applied 514 before the video is output 516.

Note also that the described network conference may include audio only, or may include audio and video, or may include a mixture of audio-only participants and audio and video participants, and even some participants who are not transmitting or receiving audio. Note as well that user interface 214 in one embodiment allows settings for multiple participants to be adjusted at the same time—e.g., two sliders for two participants can be adjusted simultaneously, even though each may start from a different level.

Furthermore, gain adjustment and image adjustments can be made by gain adjustment module 206 and image adjustment module 220 before or after buffering. For example, a stream can be received, buffered, decoded and adjusted, as described above. Alternatively, a stream can be received, decoded, adjusted, and then buffered; or received, decoded, buffered and then adjusted.

In one embodiment, system 200 applies a conventional noise filtering algorithm to eliminate noise from the audio and/or video signals prior to output. This may be undertaken automatically for all signals, or may be configurable by the user, for example via a check box or slider in user interface 214.

In one embodiment, gain adjustment module 206 determines a rate at which audio and/or video clipping occurs during a given interval. If the rate exceeds a threshold rate, the gain multiplier is lowered automatically to prevent additional clipping.

In one embodiment, a participant may be designated as a key participant, and the relative volume of each participant is automatically adjusted by gain adjustment module 206 such that the audio from the key participant is always louder than the audio from the other participants. Similarly, a key participant's video may be adjusted to always remain brighter than the other participants.

Note that although the above description assumes three or more participants in an audio or video conference, the methods described for adjusting individual audio and video properties can be equally applied to a conference in which there are only two participants.

Note also that we have used the term "videoconference" to include, at least, conferencing that contains audio only, audio and video, or video only.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the gain adjustment module, image adjustment module and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method comprising:
   receiving, at a third device of a third participant, a first video stream from a first device of a first participant, the first video stream having an image attribute set at a first level;
   determining a number of clipping events in an interval of the first video stream in which the image attribute of the first video stream overflows;
   responsive to the number of clipping events exceeding a threshold:
      determining a first multiplier that, responsive to application to the image attribute, prevents the image attribute from overflowing past an upper limit of values of the image attribute; and
      automatically adjusting the first level by the first multiplier;
   receiving, at the third device of the third participant, a second video stream from a second device of a second participant, the second video stream having the image attribute set at a second level by adjusting a second multiplier, the second level adjusted to not exceed the upper limit and adjusted independent of the first level; and
   playing, by the third device of the third participant, the received first and second video streams, the first video stream being played having the image attribute at the adjusted first level, and the second audio stream being played having the image attribute at the second level.

2. The method of claim 1, further comprising:
receiving from the third participant an instruction to adjust the second level independent of the first level; and
playing, by the device of the third participant, the second video stream having the image attribute at the adjusted second level.

3. The method of claim 1, wherein the first level is adjusted responsive to an instruction received via a user interface of a videoconference client application.

4. The method of claim 1, wherein adjusting the first level further comprises automatically adjusting the first level to equal the second level.

5. The method of claim 1, wherein the image attribute is a brightness.

6. The method of claim 1, wherein the image attribute is a contrast.

7. The method of claim 1, wherein the image attribute is a saturation.

8. The method of claim 1, wherein the image attribute is a sharpness.

9. The method of claim 1, wherein the image attribute is a hue.

10. The method of claim 1, wherein the image attribute is a zoom.

11. The method of claim 1, wherein the image attribute is a display size.

12. The method of claim 1, further comprising:
transmitting, by the device of the third participant, a third video stream having the image attribute at a third level; and receiving from the third participant an instruction to adjust the third level independent of the first level and the second level.

13. The method of claim 1, further comprising:
responsive to receiving an indication that one of the at least three participants is a key participant, automatically adjusting a level of the image attribute of a video stream received from a device of the key participant.

14. The method of claim 13, wherein the automatic adjustment is an increase in a level of brightness.

15. A computer-implemented method comprising:
receiving a first video stream from a first device of a first participant, the first video stream having an image attribute set at a first level;
determining a number of clipping events in an interval of the first video stream in which the image attribute of the first video stream overflows;
responsive to the number of clipping events exceeding a threshold level:
determining a first multiplier that, responsive to application to the image attribute, prevents the image attribute from overflowing past an upper limit of values of the image attribute; and
automatically decreasing the first level by the first multiplier;
receiving a second video stream from a second device of a second participant, the second video stream having the image attribute set at a second level by adjusting a second multiplier, the second level adjusted to not exceed the upper limit and adjusted independent of the first level;
receiving an instruction to adjust the first level;
adjusting the first level by adjusting the first multiplier to produce an adjusted first video stream; and
outputting the adjusted first video stream and the received second video stream.

16. The method of claim 15, wherein the instruction is to decrease the first level.

17. The method of claim 15, wherein the instruction is to increase the first level.

18. A system comprising:
a video stream decoder to receive a first video stream from a first device of a first participant and a second video stream from a second device of a second participant, the first video stream having an image attribute set at a first level and the second video stream having the image attribute set at a second level, the second level adjusted by adjusting a second multiplier, the second level being adjusted not to exceed an upper limit of values of the image attribute and adjusted independent of the first level; and
an image adjustment module, coupled to the video stream decoder, to:
determine a number of clipping events in an interval of the first video stream in which the image attribute of the first video stream overflows;
responsive to the number of clipping events exceeding a threshold:
determine a first multiplier that, responsive to application to the image attribute, prevents the image attribute from overflowing past an upper limit of values of the image attribute; and
automatically adjust the first level by the first multiplier;
receive an instruction to adjust the first level; and
adjust the first level by adjusting the first multiplier to produce an adjusted first video stream.

19. The method of claim 15, wherein the image attribute is at least one of brightness, contrast, saturation, sharpness, hue, zoom, or display size.

20. The system of claim 18, wherein the first level is adjusted responsive to an instruction received via a user interface of a videoconference client application.

21. The system of claim 18, wherein adjusting the first level further comprises automatically adjusting the first level to equal the second level.

22. The system of claim 18, wherein the image attribute is at least one of brightness, contrast, saturation, sharpness, hue, zoom, or display size.

23. The system of claim 18, wherein the instruction is to at least one of decrease the first level or increase the first level.

* * * * *